US007864788B2

(12) United States Patent
Paskett et al.

(10) Patent No.: US 7,864,788 B2
(45) Date of Patent: Jan. 4, 2011

(54) SYSTEM AND METHOD FOR BRIDGING PROXY TRAFFIC IN AN ELECTRONIC NETWORK

(75) Inventors: Trevor J. Paskett, Layton, UT (US); James D. Hegge, Vancouver, WA (US); Brent E. Nixon, Park City, UT (US)

(73) Assignee: Cymphonix Corporation, Sandy, UT (US)

( * ) Notice: Subject to any disclaimer, the term of this patent is extended or adjusted under 35 U.S.C. 154(b) by 123 days.

(21) Appl. No.: 12/048,166

(22) Filed: Mar. 13, 2008

(65) Prior Publication Data

US 2008/0225871 A1  Sep. 18, 2008

Related U.S. Application Data

(60) Provisional application No. 60/894,664, filed on Mar. 13, 2007.

(51) Int. Cl.
*H04L 12/28* (2006.01)
(52) U.S. Cl. ....................................................... 370/401
(58) Field of Classification Search ........................ None
See application file for complete search history.

(56) References Cited

U.S. PATENT DOCUMENTS

2003/0053448 A1* 3/2003 Craig et al. ................. 370/353
2004/0098484 A1   5/2004 Wuebker
2004/0239700 A1  12/2004 Baschy
2005/0149529 A1   7/2005 Gutmans
2006/0098667 A1*  5/2006 Shibata et al. .............. 370/401
2006/0259952 A1* 11/2006 Lok ............................. 726/1

* cited by examiner

*Primary Examiner*—Chirag G Shah
*Assistant Examiner*—Otis L Thompson, Jr.
(74) *Attorney, Agent, or Firm*—Thorpe North & Western LLP

(57) ABSTRACT

A system and method are provided of bridging proxy traffic in an electronic network. The method can include the operation of receiving a data stream from a client into a packet scanning device using a first socket. This data stream can be directed to an external communication network. The socket information for the first socket can be cached or stored in a cache in the packet scanning device using a cache ID. The first socket can then be connected to a user space process. A second socket can be generated by the user space process using the cache ID. The second socket can be modified using information retrieved from the cache based on the cache ID to make the second socket emulate the first socket. An additional operation is sending the data stream through the second socket to the external communication network.

20 Claims, 6 Drawing Sheets

US 7,864,788 B2

SYSTEM AND METHOD FOR BRIDGING PROXY TRAFFIC IN AN ELECTRONIC NETWORK

CROSS-REFERENCE TO RELATED APPLICATIONS AND CLAIM OF PRIORITY

Priority of U.S. Provisional patent application Ser. No. 60/894,664 filed on Mar. 13, 2007 is claimed.

FIELD OF THE INVENTION

The present invention relates generally to managing network communications.

BACKGROUND OF THE INVENTION

The Internet has become a valuable network communication system. It allows people to send communications around the world in a matter of minutes, access websites, and download information from a nearly unlimited number of remote locations. The Internet includes a collection of hosting servers and clients that are connected in a networked manner. In addition to the servers and client computers, there are other significant components that enable the Internet to function. Some of the components the Internet uses to transfer information include routers, gateways, switches, hubs and similar network devices.

One device of interest is a router. Routers can be considered specialized electronic devices that help send messages, information, and Internet packets to their destinations along thousands of pathways. Much of the work to get a message from one computer to another computer on a separate network is done by routers, because routers enable packets to flow between interconnected networks rather than just within localized networks. Routers receive packets from the one or more networks that they are connected to and then determine to which network the packets should be forwarded. For example, a router for a local network may receive a packet that should be kept within the network because it uses a local address. This same router will also receive packets that may need to be sent to the Internet because the packets have an Internet address.

Internet data for a message or file is broken up into packets about 1,500 bytes long. Each of these packets has a wrapper that includes information about the sender's address, the receiver's address, the packet's place in the entire message, and how the receiving computer can be sure that the packet arrived intact. Each data packet is sent to its destination via the best available route or a route that might be taken by all the other packets in the message or by none of the other packets in the message. The advantage of this scheme is that networks can balance the load across various pieces of equipment on a millisecond-by-millisecond basis. If there is a problem with one piece of equipment in the network while a message is being transferred, packets can be routed around the problem, ensuring the delivery of the entire message.

In addition to the addressing information, a packet includes a data portion that is the original information being transmitted. Data packets can be classified by the protocol used to send the information, the application being used to originate the information and the user or machine generating the network traffic, among many others. A data stream that is sent during a session is a plurality of data packets which convey the original message.

Every piece of equipment that connects to a network has a physical address, regardless of whether the equipment is located on an office network or the Internet. This is an address that is unique to the piece of equipment that is actually attached to the network cable. For example, if a desktop computer has a network interface card (NIC) in it, the NIC has a physical address permanently stored in a special memory location. This physical address, which is also called the MAC address (Media Access Control), has two parts that are each 3 bytes long. The first 3 bytes identify the company that made the NIC. The second 3 bytes are the serial number of the NIC itself.

A computer can have several logical addresses at the same time. This enables the use of several addressing schemes, or protocols, from several different types of networks simultaneously. For example, one address may be part of the TCP/IP network protocol or another networking protocol. The network software that helps a computer communicate with a network takes care of matching the MAC address to a logical address. The logical address is what the network uses to pass information along to a computer.

SUMMARY OF THE INVENTION

A system and method are provided of bridging proxy traffic in an electronic network. The method can include the operation of receiving a data stream from a client into a packet scanning device using a first socket. This data stream can be directed to an external communication network. The socket information for the first socket can be cached or stored in a cache in the packet scanning device using a cache ID. The first socket can then be connected to a user space process. A second socket can be generated by the user space process using the cache ID. The second socket can be modified using information retrieved from the cache based on the cache ID to make the second socket emulate the first socket. An additional operation is sending the data stream through the second socket to the external communication network.

DETAILED DESCRIPTION

Figure 1:
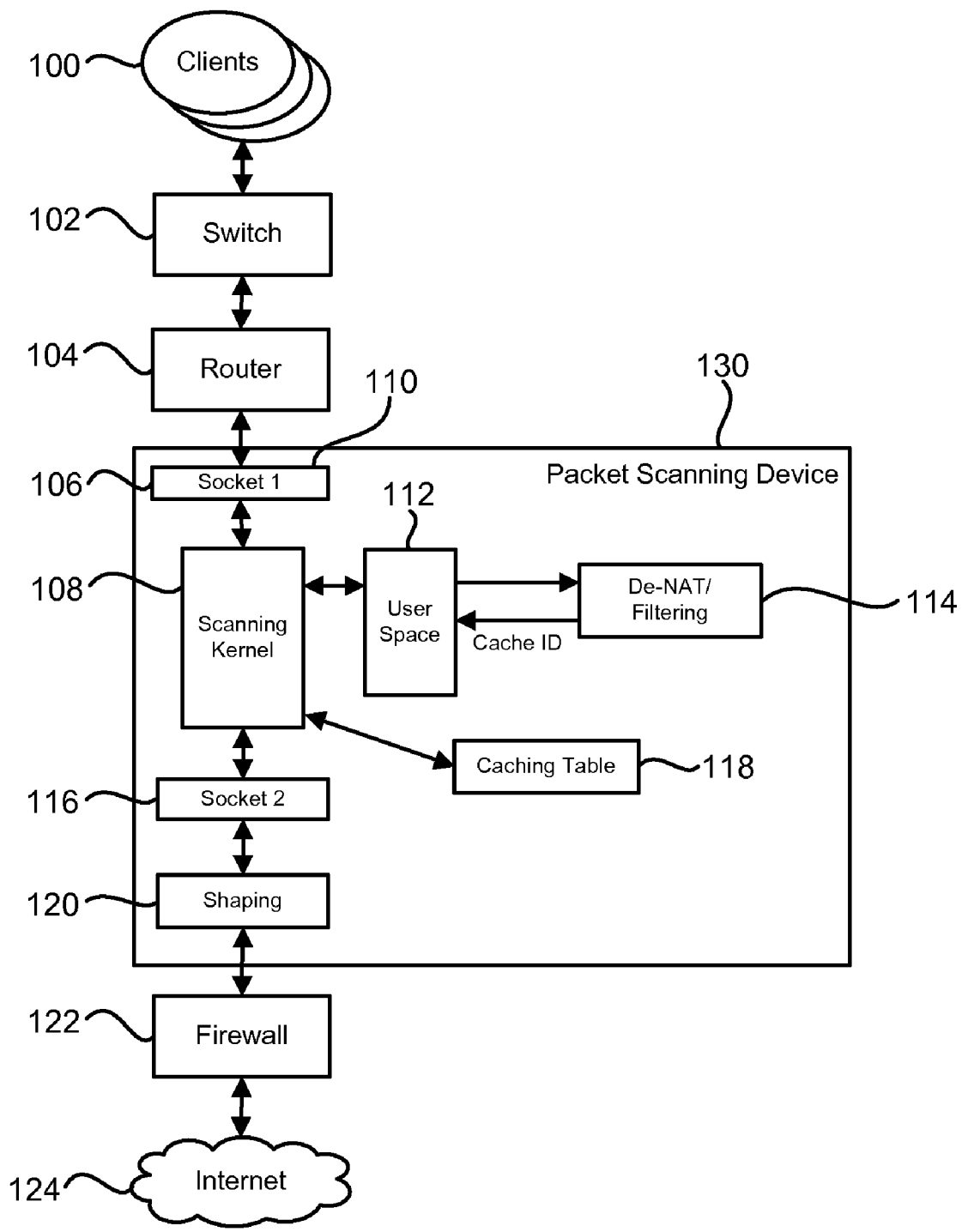
FIG. 1 is a block diagram of a system to bridge proxy traffic in an electronic network in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

A system and method are provided to bridge proxy traffic on network interface devices and packet scanning devices. FIG. 1 is a block diagram illustrating a high-level software design for the packet scanning device. In one embodiment, the packet scanning device and gateway functionality can be completely transparent to the network and interoperate transparently with other devices, such as firewalls, routers, switches, proxy servers, and other networking devices.

When packet scanning devices are not transparent to traffic on either the client side of the device or the external network side of the device then this causes problems for the traffic or packets trying to pass through the device. When such traffic disruptions exist, then the system administrator for the packet scanning device is likely to call the vendor's technical support for the packet scanning device. Any time the administrator or end user calls technical support to configure a device or other make modifications to a packet scanning device, this incurs a significant cost upon the vendor.

As a result of these expensive support costs, a packet scanning device that acts as a transparent, bump-in-the-wire device while maintaining the content filtering and tracking functionality is valuable device. In addition, it is useful to provide a device that can be quickly installed without requiring the detailed layer 2 and layer 3 networking configuration information to be entered by the system administrator or a support technician.

In the present system and method, the network topology information that the system administrator will enter into the network scanning device is substantially reduced to the following elements: the IP Address of the packet scanning device, the subnet mask of the packet scanning device, and the default gateway address for the packet scanning device.

The other aspects of the network can be transparent to the packet scanning device due to the architecture of the present system and method. This transparent architecture can also eliminate the need for adding static routes to the packet scanning device as well as eliminate the need for adding routes to other internetworking devices.

In order to assist with transparency, the traffic streams including the proxy traffic can be transparent in nature. The traffic streams can include the following attributes to enhance transparency: Source MAC Address, Source IP Address, Source VLAN.

The source MAC Address transparency can be used in the multi-unit property environment (e.g., hotels, apartments, timeshare, condos, etc.) where the property management gateway uses the MAC of each individual client for identification, billing and other purposes. The other attributes are used to help properly return the packet to the requesting client upon its response.

From the packet scanning device's point of view, there are three primary classes of traffic that the packet scanning device forwards.

1. Traffic being passed and tracked through the packet scanning device with no redirection. This is by default transparent and follows the rules of the 802.1D learning bridge. There is nothing special to do in this case as the packet scanning device can already handle this scenario without the improved architecture.
2. Traffic generated by the packet scanning device in response to management or sourcing original requesting packet. The device will use industry best practice including the default gateway topology information to respond to packet requests of this nature. Once again there is nothing required since by definition this is not a transparent operation. By definition this type of traffic will not be transparent.
3. Traffic that was originally generated by a client, but has been redirected to the packet scanning device control plane. This special case is a mode that breaks the bump-in-the-wire transparent mode for the packet scanning device. This special case is solved by the bridging embodiment described herein. The bridging can provide True Transparent Proxy (T2P) functionality. In addition it will also meet the requirement for minimal network configuration.

Making the packet scanning device transparent can minimize, if not, eliminate the number of support calls a vendor of such devices handles on a daily basis for packet scanning device related routing issues.

There are several special scenarios that have been specifically identified that can be handled by the architecture described herein:

LAN Subnets—Multiple IP Address Subnets in a LAN Autonomous Network

WAN Super Nets—Multiple IP Address Subnets per physical router interface.

LAN/WAN VLAN—Virtual LAN Tagging

When acting purely has a bridging device, these above environments are supported because the packet scanning device makes no forwarding decisions. However, when doing complex filtering in user space, these environments can become troublesome. The difficulty arises in the later cases because the traffic is, essentially, originated by the packet scanning device and therefore a determination must be made on how to forward the new packets. The determination was previously made by the standard IP mechanisms of routing tables and ARP tables. Therefore these tables have needed the correct information entered by the user to return the desired traffic flow results.

In the past, the packet scanning device was manually configured to understand the topology of the network. This configuration used a tremendous amount of support time to assist customers with the configuration. In addition, many types of internetworking devices expect to be able to see certain aspects of the traffic and hardship is caused when a packet scanning device masks traffic attributes due to the proxy nature of the device. The described embodiments make the traffic as transparent as possible while still complying with and respecting the generally accepting IP traffic forwarding and interoperability rules.

The present embodiment can use the packet scanning devices knowledge of the network topology in (LAN) and out (WAN) interfaces along with a REDIRECTED flag to make forwarding decisions. In order to perform this transparency operation, a cache of known bridging clients can be maintained. Only clients that use the cache will be able to perform the bridging functionality. The cache is used with bridging aware interfaces. The administrator can designate whether or not an interface should be T2P aware or not. Using this architecture, the packet scanning device can behave exactly the same as a piece of wire when in the forwarding mode.

The present system and method works most effectively when the client IP address sourcing the packets does not change MAC addresses in the middle of a data stream. This does not typically occur in most network topologies. The reason for this limitation is that the cache includes the MAC address and will generally be updated at the beginning of a new data traffic stream with a server or destination IP address. Of course, the MAC address can be updated more frequently which can reduce the need for this limitation, but this is a tradeoff between efficiency and flexibility that the system administrator can modify.

The bridging system can keep a cache of the following information for any client whose packets have been redirected to user space for filtering.
1. Client IP—Source IP Address of Packet Arriving on a Bridging Aware Interface.
2. Client VLAN (if any)—VLAN tag of Packet Arriving on a Bridging Aware Interface.
3. Client or Next-Hop MAC—This may be a router or a client.
4. Client interface—The physical interface that the bridging aware packet arrives upon.

The Client IP address and the VLAN may be the unique key into the cache. That is to say that a single Client IP, VLAN pair cannot contain more than one Next-Hop MAC or more than one interface. The bridging system is not providing any additional routing or forwarding functionality (e.g. it won't forward traffic between VLANS etc). It is transparent and simply delivers packets from one interface to the other in as transparent as possible manner. The bridging system described can support one client or up to thousands of clients.

In one embodiment, the interface can be tagged with an attribute or flag to instruct the packet scanning device to provide the bridging functionality on this interface. The bridging functionality can also handle packets that are sent back through the packet scanning device in the wrong directions (e.g. routing topology errors, etc).

The bridging functionality can be overridden for a bridging aware interface by selecting a group attribute to turn the functionality off for a selected group. All the traffic seen on a bridging enabled interface that does not meet a group exception will be handled by bridging interface. In the event that bridging has been disabled for a specified group, the packet scanning device will request additional topology routing information to be configured to work properly.

The cache for the bridging functionality can be indexed by two or more methods. One method maybe a hash based on the 6-tuple of VLAN, IP Protocol, Client IP, Server IP, Client Port, Server Port. The other index may be based on a Least Recently Used ordered list. This will allow old clients to be replaced by new clients when storage resources for the packet scanning device are filled. Other than by replacement, no garbage collection is necessarily needed for the hashing, but garbage collection may be included to compensate for large networks. The caching entries may also be aged or flushed when needed.

FIG. 1 illustrates a system for bridging proxy traffic in an electronic network. A packet scanning device 130 is configured to analyze incoming packets from one or more clients 100. The client can send an initial packet of a flow and it is received by the packet scanning device on the LAN interface. The forwarding plane rules for the packet scanning device determines that the packet is to be labeled with a particular packet scanning device "group" and packet scanning device application ID and then the packet can be redirected to user space.

The client packets may pass through other networking devices such as switches 102 and routers 104 before the packets reach the packet scanning device. A firewall 122 can also be located between the internet 124 and packet scanning device.

A scanning kernel 108 can be contained in the packet scanning device. The scanning kernel is configured to receive a data stream with packets being communicated between a client 100 and a server located somewhere on the internet 124.

A caching table 118 is provided that is in communication with the scanning kernel. The caching table is configured for caching socket information from a first socket from a client. The bridging functionality can look up the Client IP address and VLAN pair in the cache and either update the existing information or add an entry. In the case of an added entry, the socket information is cached into the caching table using a cached ID. The socket information can cache socket information such as the Internet Protocol (IP) address, the media access control (MAC) address, the group information, and the source VLAN. The bridging functionality associates the unique cache entry handle with the data flow and socket associated with the client.

The bridging functionality forwards the packets to the user space on the designated socket. A user space process 112 is in communication with the scanning kernel 108. The scanning kernel can communicate the unique cache entry handle to the user space process with the first packet from a data stream or before the first packet from the client has been received by the user space. The user space process may be a proxy server process.

The user space process can also create a second socket 116 that can be modified by the scanning kernel to contain duplicated socket information from the first socket. The second socket is created and modified after the packets have been de-NATTED and content filtered 114. Specifically, the user space extracts the cache entry handle and stores it along with any other state associated with the data flow.

A shaping module 120 is also provided for shaping the bandwidth of a data stream. This means that the bandwidth allocated to specific clients, applications, and other bandwidth controlling activities can be applied by the shaping module. Once the data stream has been shaped then the second socket which is updated by the information from the first socket, then the user space process can complete the client request. This will result in the data stream being sent out to the Internet and the recipient server can receive the data stream.

The bridging system does not generally modify traffic for which it either does not have a cache entry or does not have an indication that modifications have been occurring on the data stream. In addition the bridging solution can be configured to avoid modifying any packets received on a non-bridging aware interface.

When a data stream is returning in response from an external server, then the bridging system must recognize traffic originated by the user space and bound for a particular Client IP address and VLAN pair. This allows the system to replace the Layer 2 destination information with the cached Next-Hop MAC and VLAN tag. As a result, the data stream can be sent directly back to the client in a transparent fashion.

The WAN behavior of the bridging system will now be discussed. In order for the bridging system to operate properly, the bridging system can provide an opaque cache entry handle for each flow redirected to user space that uniquely identifies the cache entry for that client. Then the bridging system can provide a mechanism for the user space to communicate the association of a cache entry handle to an outbound connection or socket for the duration of the connection. When the bridging interface is activated, the bridging is configured to modify the source fields of all outbound packets on a connection associated with a cache entry handle to use the client information stored in the cache entry when forwarding the packet. However, the bridging system will not modify any fields of outbound packets for which there is no valid associated cache entry handle.

The bridging system is further configured to recognize return traffic for a flow that has been modified, and forward the inbound packet to the user space on the same socket that initiated the connection. If traffic does not belong to a bridging modified flow, then the packets will be forwarded using standard routing and forwarding plane rules. In the situation where the bridging interface receives packets entering on the WAN interface but having cache entries indicating a client interface, then the bridging interface will not redirect those packets. In other words, only the system will be configured to only redirect response packets for flows that were originally redirected on the LAN side. In order to provide the above functionality, the bridging system can track all outbound connections based on the tuple of: VLAN, Server IP, Client IP, Server Port, and the Client Port.

There are situations where packets received from the client will not be redirected to an external network but will be redirected to a client within the originating network or a different LAN that is coupled together with the originating network in a WAN configuration using a switch or bridge. This can be called the one-arm routing situation. In this case, the client sends an initial packet of a flow and it is received on the WAN interface. The forwarding plane for the packet scanning device redirect the functionality and recognize the interface. As a result the redirect target attribute is not applied to the packet. The bridging functionality recognizes that no redirect has been applied and ignores the packet, forwarding it as usual. The forwarding will forward the packet to an address within the WAN.

In the case where the packet scanning devices finds an invalid or missing cache entry handle, then a defined action can be taken. For instance, the bridging functionality may recognize the outbound traffic from the user space with an associated cache entry handle but the bridging functionality cannot find the cache entry associated with the handle. One possible response action is to have the bridging functionality forward the packet out the WAN interface.

A similar situation is presented where the packet is destined for a client located on the same LAN from where the packet originated. In this situation, the user space creates a socket to send packets out to the LAN interface to satisfy the client request. The bridging functionality recognizes the LAN interface and forwards the packet out unmodified.

In another similar situation, a response packet from a server may be received from the WAN interface in response to a client connection or request. Accordingly the bridging functionality uses the tuple of VLAN, Client IP, Server IP, Client Port, and Server Port to look up the flow and appropriate socket. Then the socket information is retrieved and the packet is modified to fit the socket profile. Any checksums are recalculated if necessary, and the packet is forwarded to the user space via the socket. If no tuple or socket is found (or another error occurs), the bridging functionality can forward the unmodified packet.

There will also be situations where a server is sending packets out through the packet scanning device. In this case, the user space sends the server information back to the client using the socket on which the client connection was received. The bridging functionality uses the cache entry handle from the socket information to identify the correct client cache entry. The destination Layer 2 information can then be modified by the bridging functionality based on the cache entry, and the bridging functionality can forward the packet.

Figure 2:
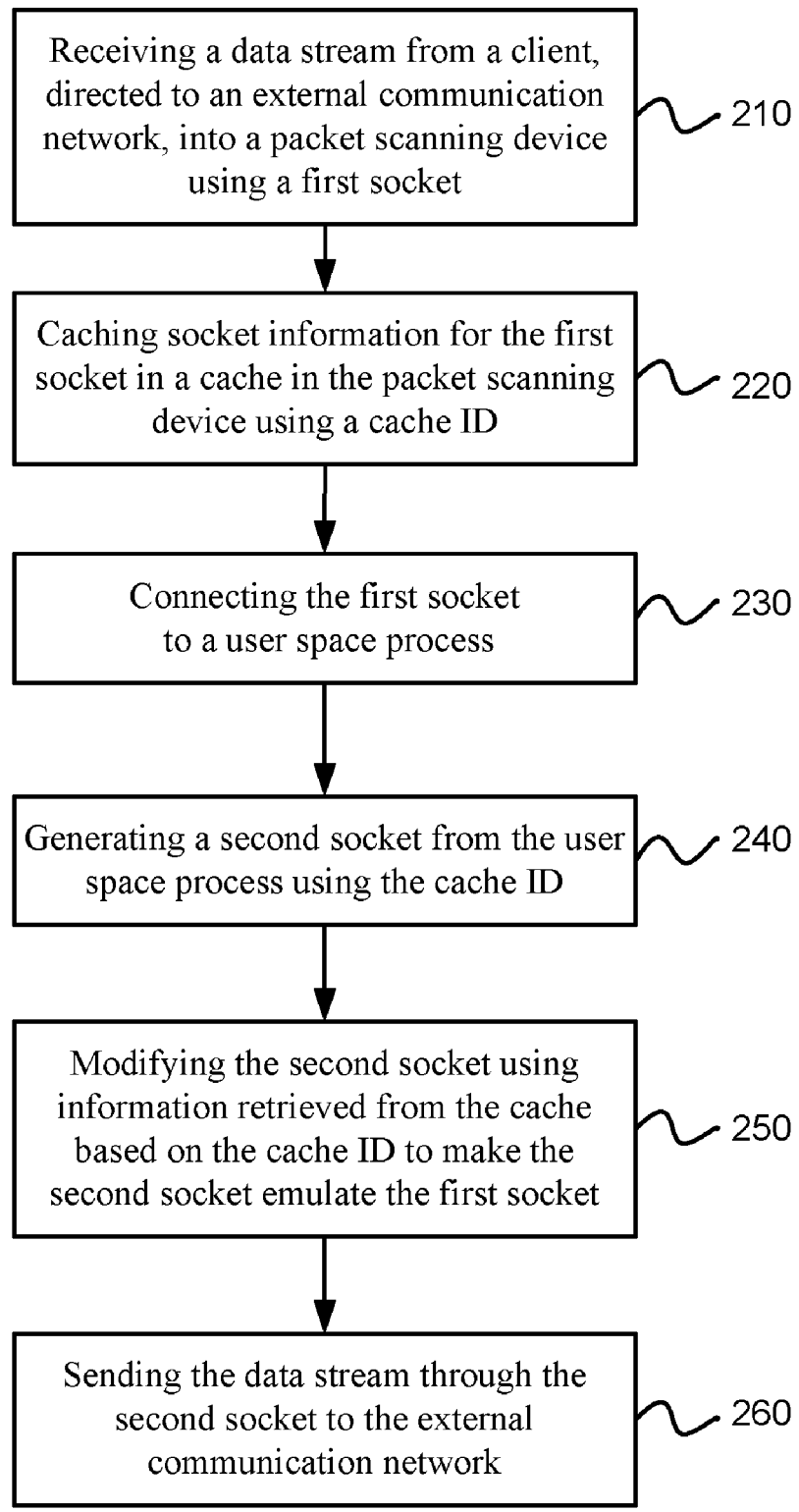
FIG. 2 is a flow chart illustrating an embodiment of a method of bridging proxy traffic in an electronic network.

FIG. 2 is a flow chart summarizing an embodiment of a method of bridging proxy traffic in an electronic network. The first operation can be receiving a data stream from a client into a packet scanning device using a first socket, as in block 210. In the most common case, the data stream is directed to a server on an external communication network. However, the traffic can be directed to a WAN or back to the same LAN from which the traffic originated.

The socket information for the first socket can be stored in a cache in the packet scanning device using a cache ID, as in block 220. The information can be stored in the cache using an independently generated key or a hash key that is created using information from the socket itself The first socket can then be connected to a user space process, as in block 230.

The second socket can be generated from the user space process using the cache ID, as in block 240. The second socket can then be modified using information retrieved from the cache based on the cache ID to make the second socket emulate the first socket. This means that important information such as client IP address, the MAC address, or the VLAN identifier can be copied into the second socket, as in block 250. This makes the second socket appear to an outside device as though the outside device is communicating with the client directly. The data stream can then be sent through the second socket to the targeted device on the external communication network.

When a response data stream for the client is received from a server located on the external network, then the bridging system will use the data from the cache to identify the sockets that should be used to send the reply information back to the client.

This will take place when a return data stream is received from a server that is part of the external communication network using the second socket. The information received can allow the user space process to retrieve cached socket information, indexed by the client information. Then the data stream from the second socket is sent to the user space process. Finally, the data stream is sent over the first socket to the client using the user space process. This first socket is recognized by the user space process because of the information retrieved from the cache.

Network Normalization

Network normalization solves an issue that can occur when the network clients 302, the default router 304, and the internet router 306 are all located on the same subnet. In this configuration shown in FIG. 3, the client's MAC address appears, from the internet router's point of view, to be the default router's MAC address for the portion of the packet flow between the default router and internet router. This situation can happen with other router configurations also.

Figure 3:
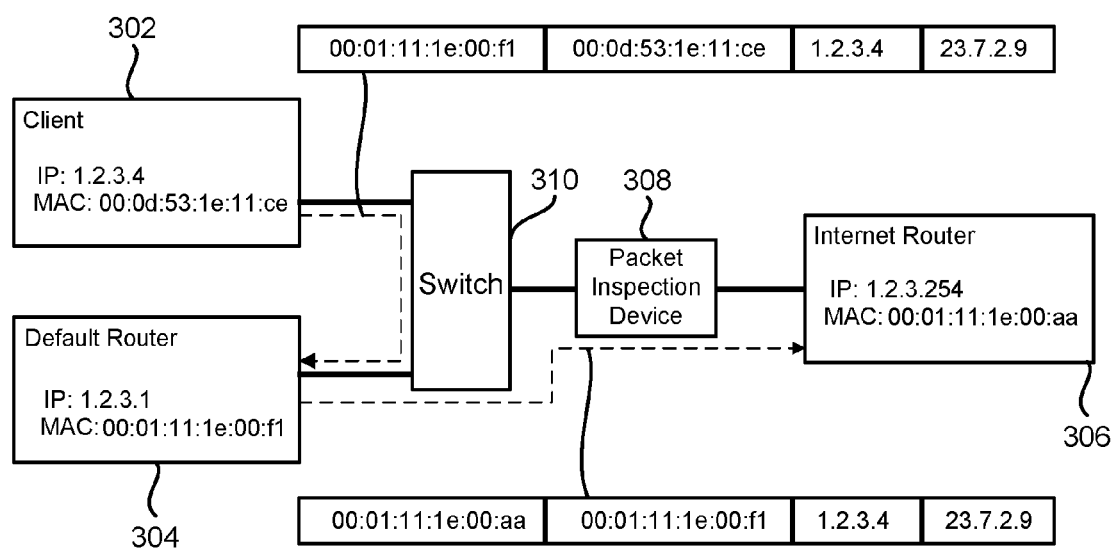
FIG. 3 is a block diagram illustrating a client and internet router, which are on the same subnet as the internal router.

The network configuration in FIG. 3, in the packet scanning context can be referred to as an "asymmetric network" because the client's MAC address has the appearance of changing over time. As can be explained by FIG. 3, the first client packet will be seen by the packet scanning device 308 and the internet router with a source MAC of 00:01:11:1e:00:f1, which is the default router MAC in this example.

The resulting problem this causes is that any firewall, IDS (Intrusion Detection System), or Network Access Gateway that depends on the MAC address for classification or reporting will be using the wrong MAC address unless the MAC address is corrected using the present system and method. In addition, the filtering groups used by the packet scanning device (described previously) are based on MAC addresses and will be using the wrong MAC address.

By applying network normalization or restoration of the hardware addresses to the example of FIG. 3, the first packet seen by the internet router will have a MAC of 00:0d:53:1e:11:ce, which is actually the client's MAC address. Network Normalization accomplishes this translation of MAC addresses using the packet scanning device 308 to record which clients are in the network configuration or on the same subnet. Then a network normalization ARP (Address Resolution Protocol) implementation can be used to apply ARP for the clients MAC addresses. In other words, the packet scanning device has a record of which subnets groups have the clients, router and internet router on the same subnet.

For the system to have this knowledge, the system administrator typically needs to be aware that they have a network configuration with a behavior like that in FIG. 3, and then the system administrator can configure the packet scanning device with the appropriate subnet information. In an alternative embodiment, artificial intelligence can be programmed into the packet scanning device to provide "automatic" recognition of this problematic network configuration. However, such software automation is expensive to create and it is often easier to have the system administrator program the appropriate subnets.

In order to perform network normalization functionality only on clients that may exhibit "asymmetric" network behavior, network masks are passed to the packet scanning device. This is done by specifying subnets that have the characteristics of FIG. 3. For example, given the network in FIG. 3, the command passed to the packet scanning device may be: ncfp -t nc_group -T 1 -p tcp --dport 80 -j EBM --to 8888 --net 1.2.3.0/255.255.255.0 This specification says that for group 1 and traffic going to port 80, configure the traffic to use local port 8888 in the packet scanning device, and if the client is in the subnet 1.2.3.0/24 then use network normalization before forwarding any client packets. In a sense, the network normalization is a pre-processing step that takes place before the packet scanning device processes that were described earlier in this document take place.

When a client packet is received, and the client is on 1.2.3.0/24 subnet, then the network normalization ARP table is queried for the client's IP address. If the IP address is in the table, then the MAC address from the ARP table is used to replace the source MAC address in the packet, and the packet follows the remainder of the typical processing for the packet scanning device described previously in this disclosure. However, if the client IP address is not found in the ARP table, then the packet is stored in the packet scanning device and an ARP request with the client IP address is sent out the client to obtain the clients MAC address.

Figure 4:
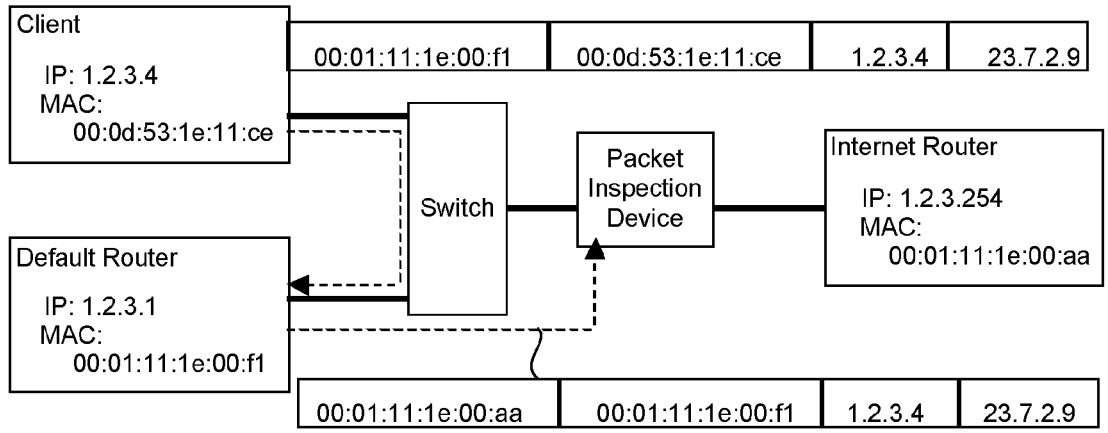
FIG. 4 is a block diagram illustrating packet flow between an internal router and a packet scanning device in an embodiment.
Figure 5:
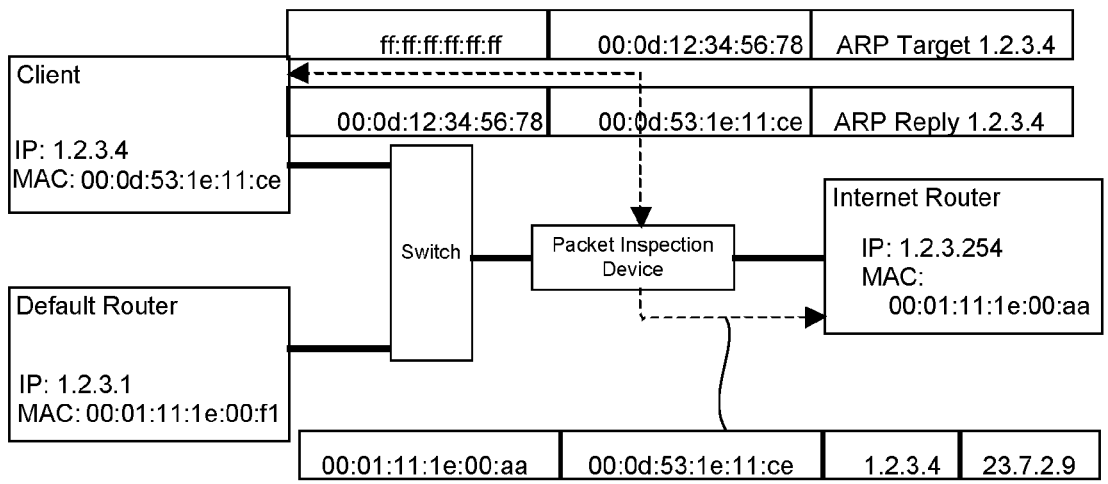
FIG. 5 is a block diagram illustrating revised packet addressing performed by the packet scanning device in an embodiment.
Figure 6:
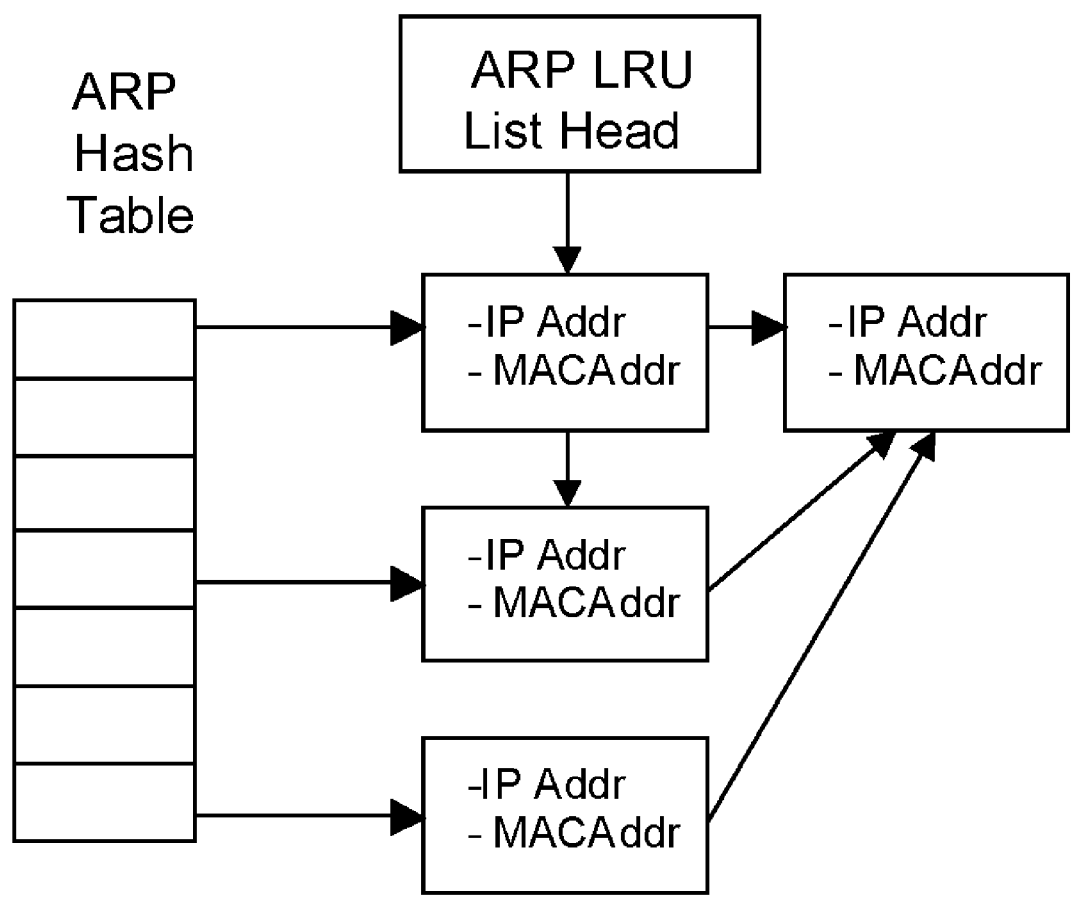
FIG. 6 is a block diagram illustrating a potential ARP table configuration in an embodiment.

FIGS. 5 and 6 illustrate this described example. FIG. 4 is similar to FIG. 3, except this time the packet scanning device holds the client's packet. FIG. 5 shows the ARP request sent by the packet scanning device and the ARP reply sent by the client. The last packet shown in FIG. 5 is the modified packet sent to the internet router by the packet scanning device with the client MAC address as the source.

FIG. 6 is an example of the ARP implementation that uses its own ARP table because the network normalization can do the ARP translation backwards. The typical ARP protocol was designed so that when a packet is to be sent out, the protocol stack can apply ARP to obtain the destination's link layer address. In network normalization, however, the system applies a modified version of ARP to obtain the source's link layer address.

On initialization, the network normalization ARP registers with both the network device to be notified of ARP packets and with the packet scanning device, so that the modified ARP can be called from the kernel module in the packet scanning device.

The first registration allows the network normalization ARP module to receive all ARP packets that the packet scanning device sees. The network normalization ARP module processes all ARP requests and replies and enters the source IP address into its hash table along with the associated source MAC address. This allows the table to have a significant number of clients MAC addresses before the client's first packet is sent. This is also the mechanism that the network normalization ARP module uses to handle replies to its own ARP requests.

Along with registration, the ARP module receives and acts on network events, such as link up and link down. This allows it to flush the ARP table if the communication link is down. Flushing the ARP table is a response to a link down because the validity of the ARP table can not be maintained when the link is down so all the data is considered invalid and flushed out.

The second registration with the packet scanning device allows the kernel module in the packet scanning device to call into the ARP to get client MAC addresses and send ARP requests. These registration are performed through the "get mac" and the "solicit" routines, where the solicit routine holds the client packet until an ARP response is seen.

FIG. 6 illustrates one possible configuration of the network normalization ARP Table Data Structures. The IP stack ARP table can use a hash table tied into the IP stack routing table. Because of this coupling, the ARP module uses its own ARP hash table, based on the Client IP that is not coupled to the IP stack. This ARP table is maintained through a timer, which has a timeout that is a module parameter. In addition, the table has an LRU ordered list of all entries. Lookups occur based on hash values and not the linked list.

When an entry is updated, its time stamp is updated to the current time and the entry is put at the end of the LRU list. Its position in the hash table, however, stays constant. If an entry has not been updated by an ARP packet by the specified timeout, the ARP entry is removed from the hash table. The next client packet will require an ARP to be sent out before it is forwarded.

While the implementation of network normalization described here has included the description of an ARP table. Other implementations could be used with a database, a table, flat file, XML file, or another storage mechanism. These other storage methods and systems can be configured to associate the IP address with the MAC address of the client and to obtain the MAC address from the client when it is not already in the storage system. In addition, the packet scanning device can also be another networking device such as a proxy server or firewall.

Figure 7:
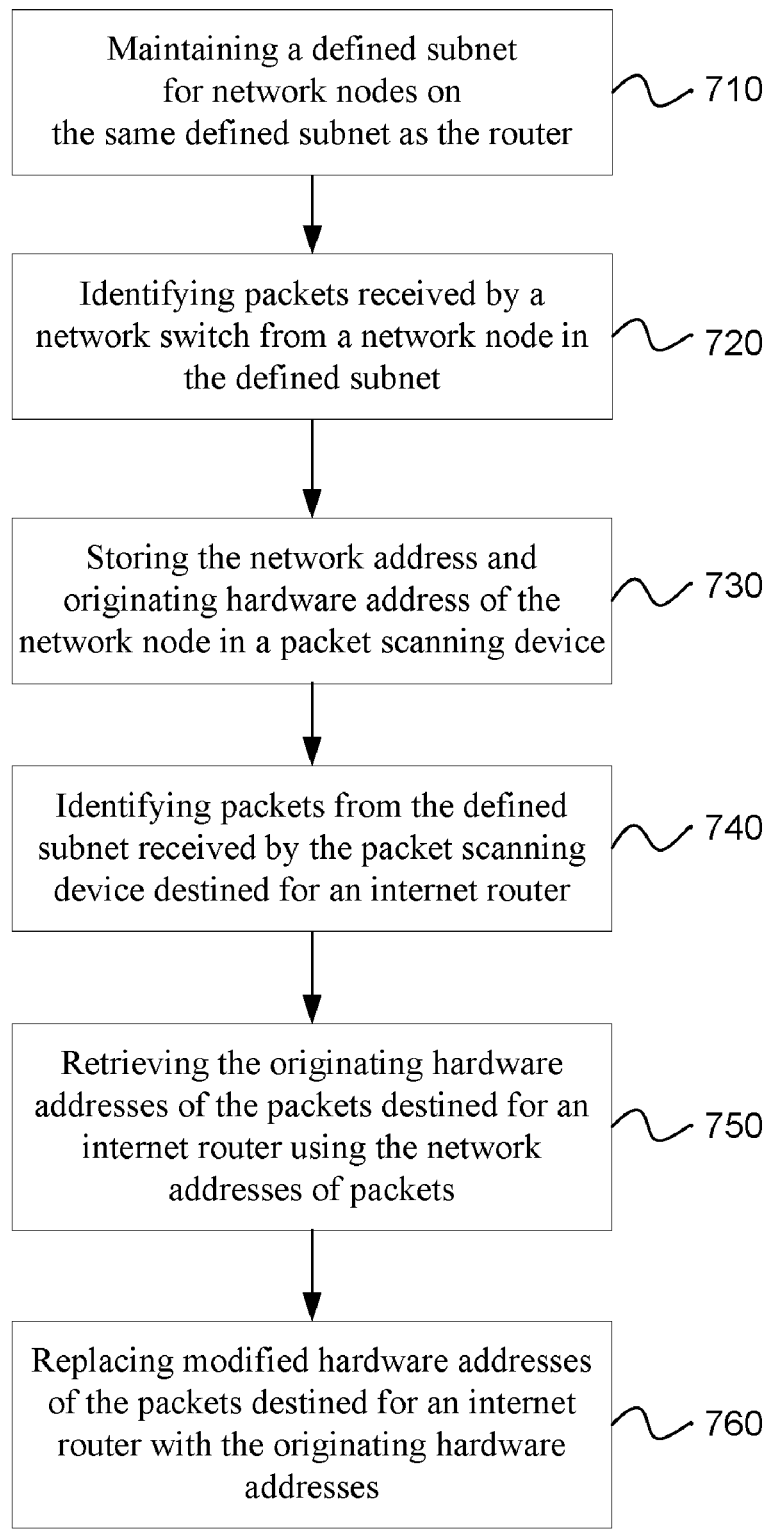
FIG. 7 is a flowchart illustrating a method for restoring a modified source address for packets changed by a default router in an embodiment.

FIG. 7 illustrates a method of restoring a modified source address for packets changed by a router. The method can include the operation of maintaining a defined subnet for network nodes on the same defined subnet as the router, as in block 710. The network nodes on the same subnet that can cause the asymmetric problem are the clients, internal router, and the internet router. Then packets received by a network switch from a network node can be identified as being in the defined subnet, as in block 720. The network address and originating hardware address of the network node can be stored in a packet scanning device, as in block 730. The network address and hardware address of network nodes can be stored in a table or some other type of database.

Another operation is identifying packets from the defined subnet received by the packet scanning device that are destined for an internet router, as in block 740. As a result, the originating hardware addresses of the packets destined for an internet router, as stored by the packet scanning device, can be retrieved using the network addresses of packets (e.g., IP address of packets). Once the hardware addresses are retrieved then the modified hardware addresses of the packets destined for an internet router are replaced with the originating hardware addresses, as in block 750. The packets with the replaced originating hardware addresses can then be forwarded to the internet router, as in block 760.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A method of bridging proxy traffic in an electronic network, comprising:
   receiving a data stream from a client into a packet scanning device using a first socket, wherein the data stream is directed to an external communication network;
   caching socket information for the first socket in a cache in the packet scanning device using a cache ID, the socket information comprising a Source media access control (MAC) address, a Source Internet Protocol (IP) address, a Source virtual local area network (VLAN) identifier, and packet group information, and the cache ID comprising a key generated using the socket information from the first socket;
   connecting the first socket to a user space process;
   generating a second socket from the user space process using the cache ID;
   modifying the second socket using information retrieved from the cache based on the cache ID to make the second socket emulate the first socket; and
   sending the data stream through the second socket to the external communication network.

2. The method of claim 1, further comprising:
   receiving a second data stream from a server that is part of the external communication network using the second socket;
   retrieving cached socket information, indexed by the client information, from within the packet scanning device;
   sending the data stream from the second socket to the user space process;
   sending the data stream over the first socket to the client using the user space process.

3. The method of claim 1, wherein the step of modifying the second socket further comprises the step of using the Source Internet Protocol (IP) address and the Source VLAN identifier to make the second socket emulate the first socket, based on the cache ID.

4. The method of claim 1, wherein the step of modifying the second socket further comprises the step of using the Source media access control (MAC) address to make the second socket emulate the first socket, based on the cache ID.

5. The method of claim 2, further comprising the step of caching the first socket information in a caching table in communication with a scanning kernel.

6. The method of claim 2, further comprising the step of generating the cache ID for the cached socket information.

7. The method of claim 1, further comprising the step of using a user space process that is a proxy server process.

8. The method of claim 1, wherein the step of receiving a data stream from a client into a packet scanning device further comprises the step of receiving the data stream into a scanning kernel using the first socket.

9. The method of claim 1, wherein the first socket and second socket are TCP sockets.

10. The method of claim 1, further comprising shaping a bandwidth of a data stream using a shaping module.

11. A system for bridging proxy traffic in an electronic network, comprising:
    a packet scanning device configured to analyze incoming packets;
    a scanning kernel contained in the packet scanning device, the scanning kernel being configure to receive a data stream between a client to a server;
    a caching table configured for caching socket information from a first socket from a client using a key generated using socket information from the first socket, the socket information comprising a source media access control MAC address, a source internet protocol (IP) address, a source virtual local area network (VLAN) identifier, and packet group information;
    a user space process in communication with the scanning kernel for executing user space processes, wherein the user space process is configured to create a second socket for the data stream using the key that can be modified by the scanning kernel to contain a duplicated socket information from the first socket.

12. The system as in claim 11, further comprising a shaping module for shaping a bandwidth of a data stream.

13. The system as in claim 11, wherein the duplicated socket information includes the source IP address and the source VLAN identifier.

14. The system as in claim 11, wherein the duplicated socket information includes the media access control (MAC) address.

15. The system as in claim 11, wherein the duplicated socket information includes the packet group information, the packet group information comprising at least one attribute common to a group of packets.

16. The system as in claim 11, further comprising a caching table in communication with a scanning kernel configured to cache the first socket information.

17. The system of claim 11, wherein the key comprises a cache ID that is generated for the cached socket information.

18. The system of claim 11, further comprising a user space process that is a proxy server process.

19. The system of claim 11, wherein the first socket and second socket are TCP sockets.

20. The system as in claim 11, wherein the system for bridging proxy traffic in the electronic network is configured to transparently bridge proxy traffic and the system further comprises a bridging aware interface enabling disablement of bridging transparency by turning the at least one group attribute off for the group of packets.

* * * * *